(12) United States Patent
Ueno

(10) Patent No.: US 6,904,539 B2
(45) Date of Patent: Jun. 7, 2005

(54) METHOD OF DETERMINING DATA TRANSFER SPEED IN DATA TRANSFER APPARATUS

(75) Inventor: Hirotaka Ueno, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 09/774,631

(22) Filed: Feb. 1, 2001

(65) Prior Publication Data

US 2002/0019952 A1 Feb. 14, 2002

(30) Foreign Application Priority Data

Aug. 9, 2000 (JP) ........................................ 2000-241292

(51) Int. Cl.$^7$ ................................................. G06F 1/08
(52) U.S. Cl. ...................... 713/500; 713/400; 713/501; 713/600; 713/502; 375/219; 375/282; 375/333; 375/354; 375/362; 360/51; 360/55; 360/281; 341/100; 341/101; 341/173; 341/181; 348/14.01
(58) Field of Search .................................. 713/400, 500, 713/501, 600, 502; 375/219, 282, 333, 354, 312; 360/51, 55, 281; 348/14.01; 341/100, 101, 173, 181

(56) References Cited

U.S. PATENT DOCUMENTS

| | | | | |
|---|---|---|---|---|
| 3,775,751 A | * | 11/1973 | Anderson | 370/465 |
| 3,864,735 A | * | 2/1975 | Davis et al. | 360/51 |
| 4,063,291 A | * | 12/1977 | Gennetten | 360/40 |
| 4,454,499 A | * | 6/1984 | Yarborough, Jr. | 341/72 |
| 4,796,280 A | * | 1/1989 | Nesin et al. | 375/360 |
| 5,226,012 A | * | 7/1993 | Amano et al. | 365/189.05 |
| 5,268,937 A | * | 12/1993 | Marbot | 375/377 |
| 5,381,397 A | * | 1/1995 | Okada | 369/124.08 |
| 5,412,697 A | * | 5/1995 | Van Brunt et al. | 375/360 |
| 5,446,765 A | * | 8/1995 | Leger | 375/359 |
| 5,528,183 A | * | 6/1996 | Maturi et al. | 327/151 |
| 5,623,522 A | * | 4/1997 | Ito | 375/369 |
| 5,651,014 A | * | 7/1997 | Kobayashi | 714/744 |
| 5,841,481 A | * | 11/1998 | Yoshikawa | 348/500 |
| 5,850,574 A | * | 12/1998 | Takita | 710/69 |
| 5,912,928 A | * | 6/1999 | Chieco et al. | 375/308 |
| 6,061,747 A | * | 5/2000 | Ducaroir et al. | 710/21 |
| 6,097,716 A | * | 8/2000 | Abrishamkar | 370/342 |
| 6,104,697 A | * | 8/2000 | Kwon | 370/232 |
| 6,222,875 B1 | * | 4/2001 | Dahlman et al. | 375/130 |
| 6,269,127 B1 | * | 7/2001 | Richards | 375/282 |
| 6,292,621 B1 | * | 9/2001 | Tanaka et al. | 386/56 |
| 6,313,879 B1 | * | 11/2001 | Kubo et al. | 348/512 |
| 6,320,825 B1 | * | 11/2001 | Bruekers et al. | 369/30.17 |
| 6,424,631 B1 | * | 7/2002 | Czaja et al. | 370/252 |
| 6,509,988 B1 | * | 1/2003 | Saito | 398/47 |

* cited by examiner

*Primary Examiner*—Lynne H. Browne
*Assistant Examiner*—Nitin C. Patel
(74) *Attorney, Agent, or Firm*—Arent Fox, PLLC

(57) ABSTRACT

A method of determining a transfer speed of an encoded data signal including a clock signal and a data signal is provided. First, the encoded data signal is decoded to generate a decoded clock signal. Then, a data transfer speed of the encoded data signal is determined using the decoded clock signal.

13 Claims, 4 Drawing Sheets

METHOD OF DETERMINING DATA TRANSFER SPEED IN DATA TRANSFER APPARATUS

BACKGROUND OF THE INVENTION

The present invention relates to a method of determining a data transfer speed, and more particularly, to a method of determining a data transfer speed in an interface apparatus in conformity to IEEE1394.

The IEEE1394 protocol is known as a standard for an interface for transferring data such as audio data, image data and so on at a high speed between a personal computer and a peripheral device. The IEEE1394 protocol is advantageous in its high degree of freedom in bus topology which permits a daisy chain topology, a star topology, and so on.

A Data-Strobe Link (DS-LINK) coding scheme is employed for a transfer format of the IEEE1394 protocol. The DS-LINK coding scheme encodes a clock signal and a data signal to generate an encoded data signal and a strobe signal. When data having the same value are continuously output, the continuity of the data is represented by changing the value of the strobe signal. A clock signal is generated by performing an exclusive OR operation of the encoded data and the strobe signal.

The IEEE1394 protocol standardizes three data transfer speeds: 100 Mbps, 200 Mbps and 400 Mbps. Therefore, for transferring data between devices, a data transfer speed must be notified to the destination device by speed signaling each time data packets are transmitted. The device, that is notified of the data transfer speed, repeatedly transfers the received data packets to the next device at the notified data transfer speed.

The speed signaling is performed by supplying a bias signal to a signal line for the strobe signal of a 1394 cable. The bias signal is supplied for a fixed period (data prefix period) before the transmission of data packets. One of the data transfer speeds 100 Mbps, 200 Mbps, and 400 Mbps is specified depending on the analog level of the bias signal. A receiver recognizes a data transfer speed by detecting the analog level of the bias signal.

The recognition of the data transfer speed requires a strict detection of the analog level of the bias signal. Therefore, in a poor use environment which may involve an instable power supply, and so on, an error is likely to occur in the detection of the analog level of the bias signal.

Also, the detection of the analog level of the bias signal requires an analog-to-digital converter circuit which has a relatively large circuit area. Therefore, a larger semiconductor integrated circuit device must be built in an interface controller.

Further, negotiations for a data transfer speed performed in IEEE1394 impede an improvement in transfer efficiency.

SUMMARY OF THE INVENTION

It is a first object of the present invention to provide a method of determining a data transfer speed that reliably determines a data transfer speed.

It is a second object of the present invention to provide a method of determining a data transfer speed that has an improved data transfer efficiency.

In a first aspect of the invention, a method of determining a transfer speed of an encoded data signal including a clock signal and a data signal is provided. First, the encoded data signal is decoded to generate a decoded clock signal. Then, a data transfer speed is determined using the decoded clock signal.

In a second aspect of the present invention, a method of transferring an encoded data signal including a clock signal and a data signal is provided. First, the encoded data signal is decoded to generate a decoded data signal and write clock signal. The decoded data signal is stored in a memory in accordance with the write clock signal. A transfer speed of the encoded data signal is determined using the write clock signal. A read clock signal, which has a frequency corresponding to the determined data transfer speed, is generated. Then, the decoded data signal stored in the memory is read in accordance with the read clock signal. The read decoded data signal and the read clock signal are encoded to generate an encoded data signal.

In a third aspect of the present invention, an apparatus for transferring an encoded data signal including a clock signal and a data signal is provided. The apparatus includes an decoder circuit for decoding the encoded data signal to generate a decoded data signal and write clock signal. A memory is connected to the decoder circuit to store the decoded data signal in accordance with the write clock signal. A transfer speed determining circuit determines a transfer speed of the encoded data signal in accordance with the write clock signal. The transfer speed determining circuit generates a read clock signal having a frequency corresponding to the determined transfer speed. The decoded data signal is read from the memory in accordance with the read clock signal. An encoder circuit is connected to the memory and the transfer speed determining circuit to encode the decoded data signal and the read clock signal to generate the encoded data signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A data transfer apparatus in one embodiment of the present invention will hereinafter be described with reference to the drawings.

Figure 1:
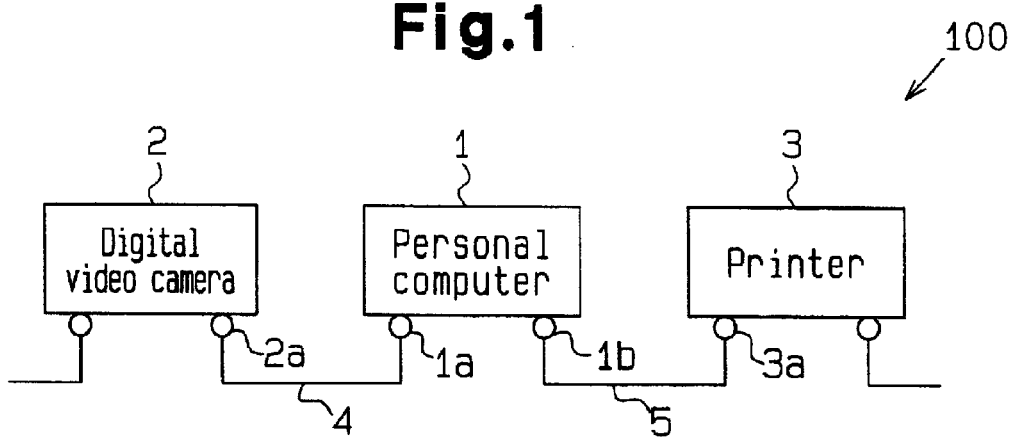
FIG. 1 is a schematic block diagram illustrating a data transfer system of one embodiment of the present invention.

As illustrated in FIG. 1, a data transfer system 100 in conformity to the IEEE1394 protocol includes a personal computer 1, a digital video camera 2, and a printer 3. Each of the personal computer 1, digital video camera 2 and printer 3 includes an interface device for performing a data transfer in conformity to the IEEE1394 protocol, and is interconnected via IEEE1394 bus cables 4, 5 to constitute a daisy chain type bus topology. More specifically, a first input/output port 1a of the personal computer 1 is connected to an input/output port 2a of the digital video camera 2 via the bus cable 4, while a second input/output port 1b of the personal computer 1 is connected to an input/output port 3a of the printer 3 via the bus cable 5.

Figure 2:
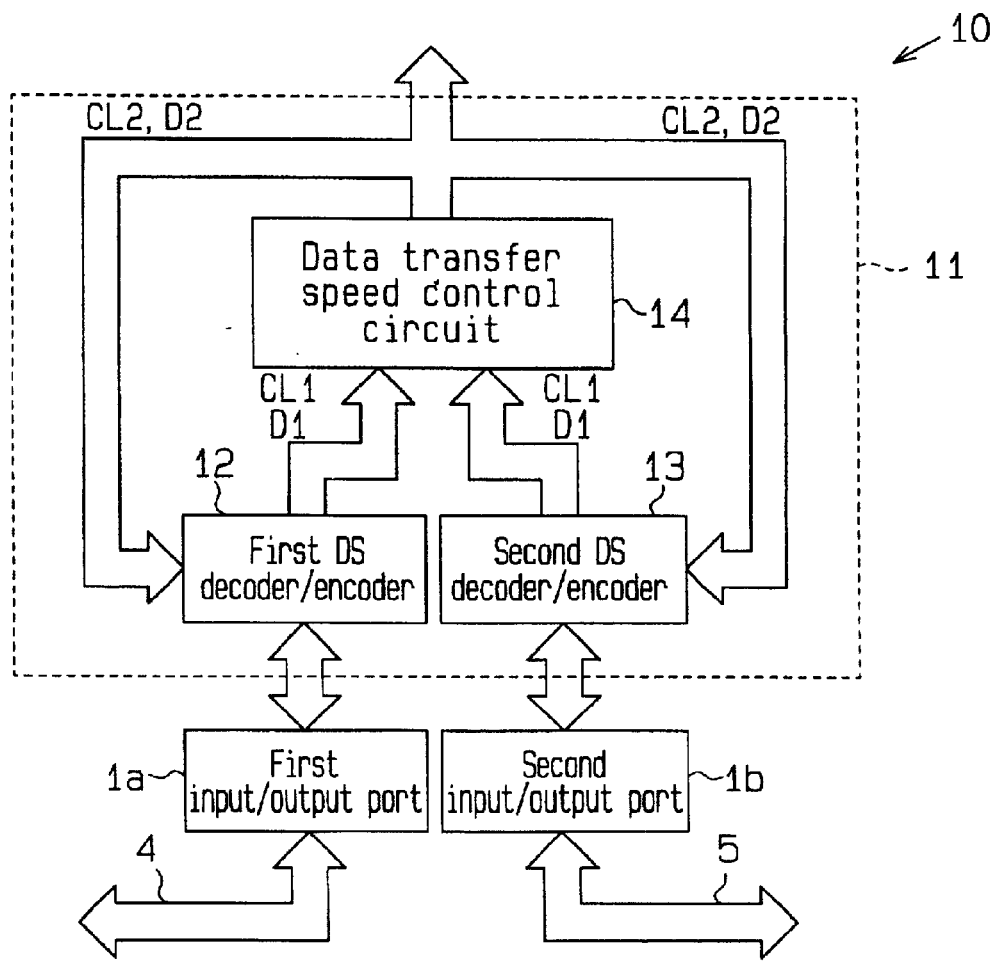
FIG. 2 is a schematic block circuit diagram illustrating an interface device for a personal computer of the system of FIG. 1.

The interface device 10 of the personal computer 1 is described in FIG. 2. Since the interface devices of the digital video camera 2 and the printer 3 are identical in configuration to the interface device of the personal computer 1, description thereon is omitted.

As illustrated in FIG. 2, the interface device 10 includes a physical layer processing circuit 11, which has a first DS decoder/encoder 12 and a second DS decoder/encoder 13, and a data transfer speed control circuit 14.

The first DS decoder/encoder 12 is connected to the bus cable 4 via the first input/output port 1a to communicate data with the digital video camera 2. The first DS decoder/encoder 12 decodes DS-LINK encoded data (a data signal and a strobe signal) supplied from the digital video camera 2 to generate a data signal D1 and a DS clock signal CL1 as a write clock signal.

The first DS decoder/encoder 12 receives a read data signal D2 and a read clock signal CL2 supplied from the data transfer speed control circuit 14, each of which is generated by an internal logic circuit (not shown). The first DS decoder/encoder 12 encodes the read data signal D2 and the read clock signal CL2 in accordance with the DS-LINK coding scheme to generate a data signal and a strobe signal. The data signal and the strobe signal are supplied to the digital video camera 2 via the bus cable 4.

The second DS decoder/encoder 13 is connected to the bus cable 5 via the second input/output port 1b to communicate data with the printer 3. The second DS decoder/encoder 13 decodes DS-LINK encoded data (a data signal and a strobe signal) supplied from the printer 3 to generate the DS clock signal CL1 and the DS data signal D1.

The second DS decoder/encoder 13 receives the read data signal D2 and the read clock signal CL2, which are supplied from the data transfer speed control circuit 14 and are generated by the internal logic circuit (not shown). The second DS decoder/encoder 13 encodes the read data signal D2 and the read clock signal CL2 in accordance with the DS-LINK coding scheme to generate a data signal and a strobe signal. The data signal and the strobe signal are supplied to the printer 3 via the bus cable 5.

The data signal and the strobe signal, which are supplied from the digital video camera 2, are transferred to the printer 3 via the first DS decoder/encoder 12, data transfer speed control circuit 14 and second DS decoder/encoder 13, which is refereed as a repeat transfer.

The data signal and the strobe signal, which are supplied from the printer 3, are transferred to the digital video camera 2 via the second DS decoder/encoder 13, data transfer speed control circuit 14 and first DS decoder/encoder 12, which is refereed as the repeat transfer.

The data signal and the strobe signal, which are supplied from the digital video camera 2, are transferred to an internal logic circuit of the personal computer 1 as the read data signal D2 and the read clock signal CL2 via the first DS decoder/encoder 12 and the data transfer speed control circuit 14.

The read data signal D2 and the read clock signal CL2, which are generated by the personal computer 1, are transferred to the digital video camera 2 as a data signal and a strobe signal via the first DS decoder/encoder 12.

The data signal and the strobe signal, which are supplied from the printer 3, are supplied to the internal logic circuit of the personal computer 1 as the read data signal D2 and the read clock signal CL2 via the second DS decoder/encoder 13 and the data transfer speed control circuit 14.

The read data signal D2 and the read clock signal CL2, which are generated by the personal computer 1, are transferred to the printer 3 as a data signal and a strobe signal via the second DS decoder/encoder 13.

Figure 3:
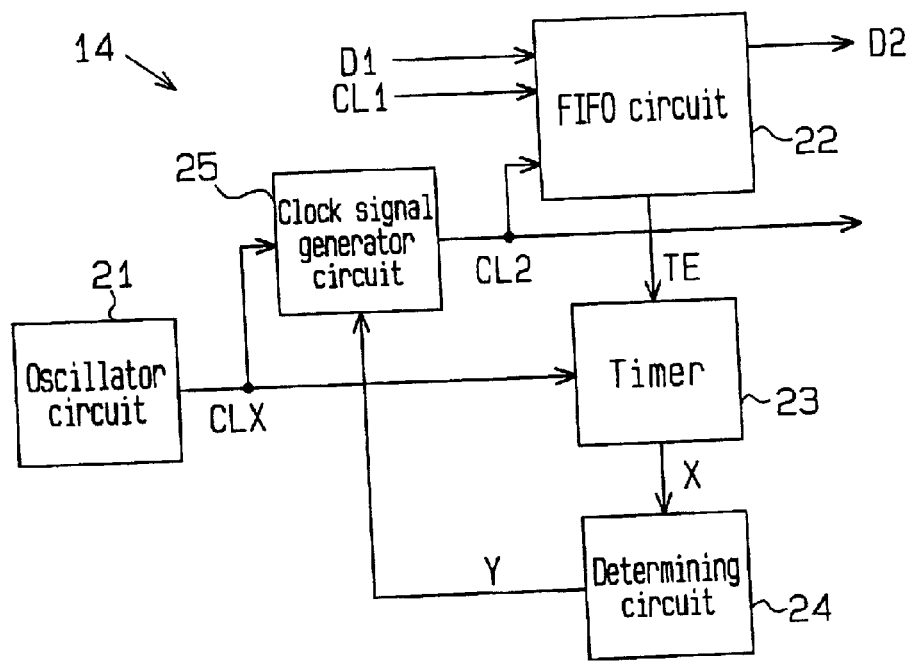
FIG. 3 is a schematic block diagram illustrating a data transfer speed control circuit of the interface device of FIG. 2.

As illustrated in FIG. 3, the data transfer speed control circuit 14 includes an oscillator circuit 21, a FIFO (First In First Out) circuit 22, a timer 23, a determining circuit 24, and a clock signal generator circuit 25. The timer 23, the determining circuit 24 and the clock signal generator circuit 25 form a transfer speed determining circuit.

The oscillating circuit 21 generates a reference clock signal CLX at 400 MHz which is supplied to the timer 23 and the clock signal generator circuit 25.

Figure 8:
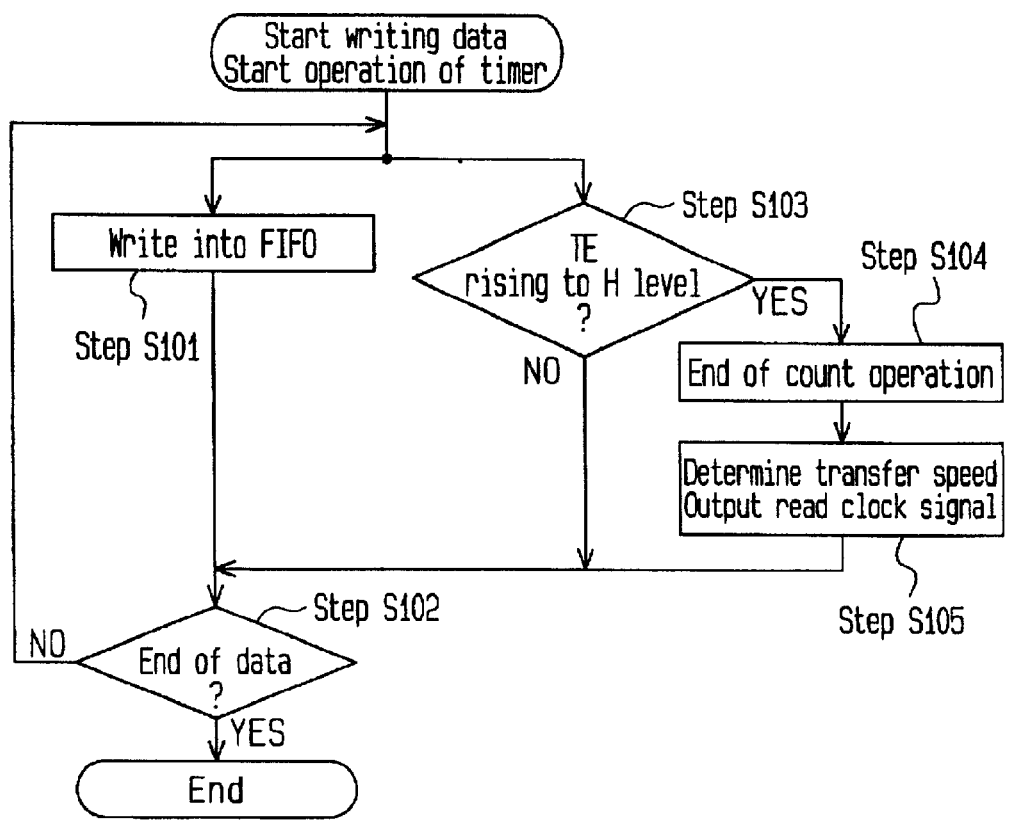
FIG. 8 is a flow chart showing the operation of the data transfer speed control circuit of FIG. 3.

The FIFO circuit 22 sequentially stores the DS data signal D1 bit by bit in accordance with the DC clock signals CL1 from the first and second DS decoder/encoders 12, 13. Specifically, as illustrated in FIG. 8, the FIFO circuit 22 stores the DS data signal D1 in accordance with the DS clock signal CL1 while the DS clock signal CL1 and the DS data signal D1 are being supplied, in accordance with steps S101, S102.

The FIFO circuit 22 sequentially reads the stored DS data signal D1 in accordance with the read clock signal CL2, bit by bit, to output a read data signal D2.

Figure 4:
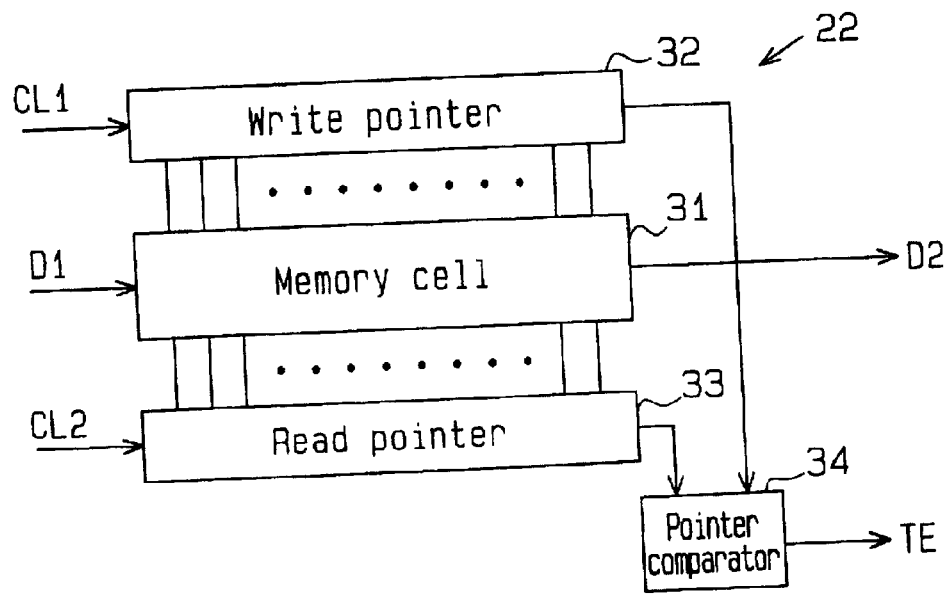
FIG. 4 is a schematic block diagram illustrating a FIFO circuit of the data transfer speed control circuit of FIG. 3.

As illustrated in FIG. 4, the FIFO circuit 22 includes a memory cell circuit 31, a write pointer 32, a read pointer 33, and a pointer comparator 34. The write pointer 32 shifts a write address in the memory cell circuit 31 in accordance with the DS clock signal CL1. The memory cell circuit 31 stores one bit of the DS data signal D1 in accordance with the write address from the write pointer 32, each time the write address is shifted.

The read pointer 33 shifts a read address of the memory cell circuit 31 in accordance with the read clock signal CL2. The memory cell circuit 31 outputs one bit of the DS data signal D1 written therein as a read data signal D2 in accordance with the read address from the read pointer 33, each time the read address is shifted.

The pointer comparator 34 receives a write address pointed by the write pointer 32 and a read address pointed by the read pointer 33 to recognize a write situation and a read situation of the DS data signal D1 in the memory cell circuit 31 based on the write and read addresses.

Figure 6:
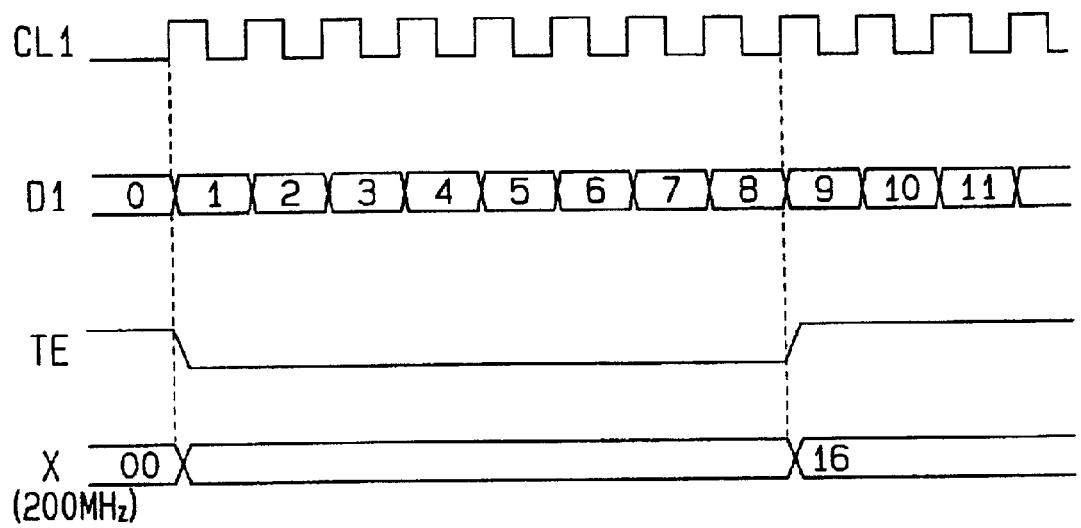
FIG. 6 is a timing chart for explaining the operation of the FIFO circuit of FIG. 4.

The pointer comparator 34 counts the number of bits of the DS data signal D1 transmitted from the digital video camera 2 (or from the printer 3) and outputs a timer control signal TE, which has a low potential (L level), as illustrated in FIG. 6, while eight bits of the DS data signal D1 are written. More specifically, the pointer comparator 34 outputs the timer control signal TE having the L level when the DS data signal D1 and the DS clock signal CL1 of the digital video camera 2 (or the printer 3) are supplied from the first DS decoder/encoder 12 (or from the second DS decoder/ encoder 13) in a state where no DS data signal D1 has been written into the memory cell circuit 31 and the write address is coincident with the read address. Thus, the DS data signal D1 is sequentially written into the memory cell circuit 31 in accordance with the DS clock signal CL1. At this time, since the read clock signal CL2 is not output, the read pointer 33 is inoperative.

When eight bits of the DS data signal D1 have been written (when a difference between the write address and the read address reaches "8"), the pointer comparator 34 raises the timer control signal TE from the L level to a high potential (H level).

The timer 23 counts a time (count value X) required to write eight bits of the DS data signal D1 into the memory cell circuit 31 in response to the timer control signal TE. More specifically, the timer 23 is reset at the time the timer control signal TE falls to the L level and starts counting the reference clock signal CLX of 400 MHz. As shown in steps S103, S104 in FIG. 8, the timer 23 stops the counting operation when the timer control signal TE rises to the H level and outputs the count value X.

The determining circuit 24 receives the count value X from the timer 23 and determines a transfer speed of data transferred to the digital video camera 2 (or the printer 3) based on the count value X. Specifically, the determining circuit 24 determines that the data transfer speed is 400 MHz when the count value is less than "10". The determining circuit 24 determines that the data transfer speed is 200 MHz when the count value X is equal to or more than "10" and less than "18". Further, the determining circuit 24 determines that the data transfer speed is 100 MHz when the count value X is equal to or more than "18". A determination value used by the determining circuit 24 has been stored in the predetermined determination table (not shown), and the determination is made based on the determination value.

The determining circuit 24 determines that the data transfer speed is 400 MHz even when the count value X is "9", "8" or "7". In other words, the count value X within the predetermined range corresponds to one data transfer speed. More exactly, when the transfer speed of the DS data signal D1 is 400 MHz, the count value X is "8". When the transfer speed of the DS data signal D1 is 200 MHz, the count value X is "16". When the transfer speed of the DS data signal D1 is 100 MHz, the count value X is "32". However, the transfer speed of the digital video camera 2 (or the printer 3) may become slightly higher or lower, for example, than 400 MHz for some reason. To compensate for an error in the transfer speed, the embodiment provides a certain margin to the count value. With this expedient, the data transfer speed can be correctly determined even if the count value X is not "8".

Figure 7:
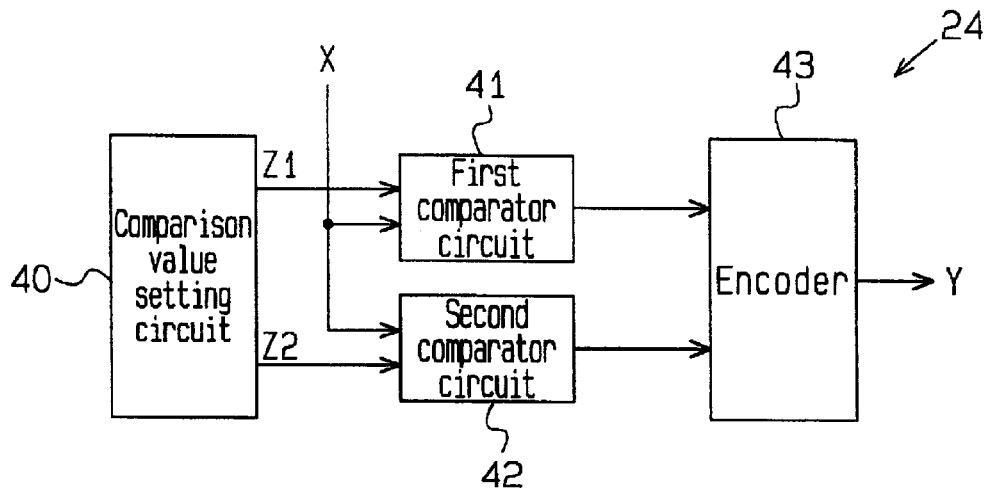
FIG. 7 is a schematic block diagram illustrating a determining circuit of the data transfer speed control circuit of FIG. 3.

As illustrated in FIG. 7, the determining circuit 24 includes a comparison value setting circuit 40, a first and a second comparator circuit 41, 42, and an encoder 43. The comparison value setting circuit 40 supplies a first comparison value Z1 and a second comparison value Z2 to the first comparator circuit 41 and the second comparator circuit 42, respectively. In this embodiment, the first comparison value Z1 is set to "10", while the second comparison value Z2 is set to "18".

The first comparator circuit 41 compares the count value X of the timer 23 with the first comparison value Z1 to generate a first comparison result signal having the L level when the count value X is less than the first comparison value Z1 (X<Z1). The first comparison circuit 41 generates the first comparison result signal having the H level when the count value X is equal to or more than the first comparison value Z1 (X≧Z1).

The second comparator circuit 42 compares the count value X of the timer 23 with the second comparison value Z2 to generate a second comparison result signal having the L level when the count value X is less than the second comparison value Z2 (X<Z2). The second comparator circuit 42 generates the second comparison result signal having the H level when the count value X is equal to or more than the second comparison value Z2 (X≧Z2).

The encoder 43 receives the first and second comparison result signals from the first and second comparator circuits 41, 42 and determines a data transfer speed based on the first and second comparison result signals Z1, Z2 to generate a determination result Y. More specifically, the encoder 43 generates the determination result Y indicating that the data transfer speed is 400 MHz when the first and second comparison result signals have the H level. The encoder 43 generates the determination result Y indicating that the data transfer speed is 200 MHz when the first comparison result signal has the H level and the second comparison result signal has the L level. Further, the encoder 43 generates the determination result Y indicating that the data transfer speed is 100 MHz when the first and second comparison result signals have the L level.

The clock signal generator circuit 25 divides the reference clock signal CLX of 400 MHz in accordance with the determination result Y from the determining circuit 24 to generate the read clock signal CL2. Specifically, when the determination result Y indicates 100 MHz, the clock signal generator circuit 25 divides the reference clock signal CLX by four to generate the read clock signal CL2 of 100 MHz. When the determination result Y indicates 200 MHz, the clock signal generator circuit 25 divides the reference clock signal CLX by two to generate the read clock signal CL2 of 200 MHz. Further, when the determination result Y indicates 400 MHz, the clock signal generator circuit 25 outputs the read clock signal CL2 of 400 MHz without dividing the reference clock signal CLX. Thus, the clock signal generator circuit 25 generates the read clock signal CL2 which has a frequency corresponding to the data transfer speed determined by the destined digital video camera 2 (or printer 3).

Figure 5:
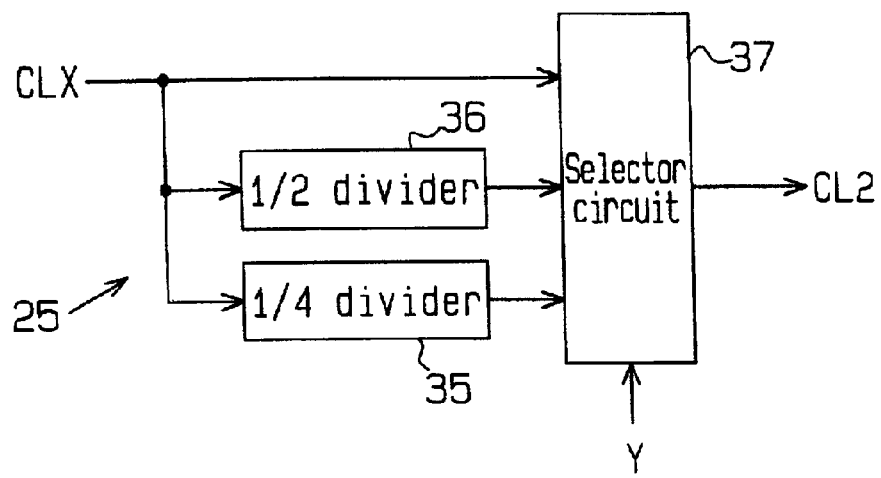
FIG. 5 is a schematic block diagram illustrating a clock signal generating circuit of the data transfer speed control circuit of FIG. 3.

As illustrated in FIG. 5, the clock generator circuit 25 includes a ¼ divider 35, a ½ divider 36, and a selector circuit 37. The ¼ divider 35 divides the reference clock signal CLX of 400 MHz by four to supply the selector circuit 37 with a ¼ divided signal. The ½ divider 36 divides the reference clock signal CLK of 400 MHz by two to supply the selector 37 with a ½ divided signal.

The selector circuit 37 selects any one of the reference clock signal CLX, ½ divided signal and ¼ divided signal in accordance with the determination result Y from the determining circuit 24 and outputs the selected signal as the read clock signal CL2. The selector circuit 37 does not output the read clock signal CL2 when no DS data signal D1 is written in the memory cell circuit 31 and when the write address is coincident with the read address. In other words, the selector 37 waits until it is supplied with the determination result Y from the determining circuit 24.

Thus, as shown in step S105 of FIG. 8, the read clock signal CL2 is supplied to the FIFO circuit 22 after eight bits of the DS data signal D1 from the digital video camera 2 (or from the printer 3) have been written to the memory cell circuit 31. In other words, after eight bits of the DS data signal D1 from the digital video camera 2 (or from the printer 3) have been written, the data is read from the FIFO circuit 22 in accordance with the data transfer speed of the transmitter side.

In the repeat transfer, the read data signal D2 read from the FIFO circuit 22 is supplied to the first DS decoder/encoder 12 (or the second DS decoder/encoder 13) together with the read clock signal CL2. In other words, when the data is destined for the digital video camera 2, the read data signal D2 and the read clock signal CL2 are supplied to the first DS decoder/encoder 12. When the data is destined for the printer 3, the read data signal D2 and the read clock signal CL2 are supplied to the second DS decoder/encoder 13.

The first and second DS decoder/encoders 12, 13 encode the read data signal D2 and the read clock signal CL2 in accordance with the DS-LINK coding scheme and transfers the encoded data signal and a strobe signal to the digital video camera 2 (or to the printer 3).

The interface device 10 of the embodiment has the following advantages:

(1) Based on a measured time (count value X) required to store eight bits of the DS data signal D1 in the FIFO circuit 22 in accordance with the DS clock signal CL1, the data transfer speed of the digital video camera 2 (or the printer 3) is determined. It is therefore possible to recognize the data transfer speed of the digital video camera 2 (or the printer 3) without detecting the analog level of the bias signal supplied for the predetermined period before transmission of the data signal for speed signaling in the IEEE1394 protocol.

Moreover, when the data transfer speed is recognized, the read clock signal CL2 corresponding to the data transfer speed is immediately generated, and the DS data signal D1 is read from the FIFO circuit 22 in accordance with the read clock signal CL2 and transferred to a destination device via the first DS decoder/encoder 12 (or the second DS decoder/encoder 13). Thus, in the repeat transfer of the IEEE1394, the data signal is reliably transferred at the data transfer speed of the digital video camera 2 (or the printer 3) on the transmission side.

Since all devices on the network topology include the interface device 10, a plurality of devices can mutually perform the repeat transfer of the IEEE1394 protocol, while omitting the speed signaling in IEEE1394. This results in elimination of the speed signaling phase in IEEE1394, so that the data transfer efficiency is improved.

(2) Since the recognition of the data transfer speed does not involve detecting the analog level of the bias signal, no analog-to-digital converter circuit is required for detecting the analog level of the digital signal. Therefore, a smaller semiconductor integrated circuit device may be built in the interface controller.

(3) An actual data transfer speed is measured based on an encoded data signal and a strobe signal supplied from the digital video camera 2 (or the printer 3) on the transmission side to recognize the data transfer speed of the digital video camera 2 (or the printer 3). This ensures that the data transfer speed is correctly determined, as compared with the determination of the analog level of the bias signal, without depending on a particular environment in which the data transfer apparatus is used.

(4) The FIFO circuit 22 includes the comparator 34 for generating the timer control signal TE, which has the L level, indicative of a period in which eight bits of the DS data signal D1 are stored in the FIFO circuit 22 in accordance with the DS clock signal CL1. The comparator 34 occupies a circuit area smaller than a dedicated circuit which is provided exclusively for generating the timer control signal TE.

(5) The timer 23 measures a time taken to store eight bits of the DS data signal D1 by counting the reference clock signal CLX of 400 MHz, which is output from the oscillator circuit 21, while the timer control signal TE remains at L level. Therefore, a dedicated oscillator circuit is not required for generating a clock signal, so that the circuit area is reduced.

(6) The clock signal generator circuit 25 generates the read clock signals CL2 of 400 MHz, 200 MHz or 100 MHz from the reference clock signal CLX of 400 MHz. Therefore, no independent oscillator circuit is required for each frequency, so that the circuit area is reduced.

(7) The determining circuit 24 determines that the data transfer speed is 400 MHz when the count value X is less than 10; the data transfer speed is 200 MHz when the count value X is equal to or more than 10 and less than 18; and the data transfer speed is 100 MHz when the count value X is equal to or more than 18. Thus, even if the data transfer speed of a device at the transmission side fluctuates slightly for some reason, a reliable determination is provided without causing disabled determination or erroneous determination.

It should be apparent to those skilled in the art that the present invention may be embodied in many other specific forms without departing from the spirit or scope of the invention. Particularly, it should be understood that the invention may be embodied in the following forms.

(a) A time required to store less than eight bits of the DS data signal D1, such as four bits, six bits, or the like may be measured. In this case, a time required for the determination is reduced.

The foregoing embodiment is applied to the DS data signal D1, the minimum unit (packet) of which is eight bits. When it is ensured that the data signal D1 in the form of a packet including eight bits or more is transferred at all times, a time required to store a data signal of bits larger than eight may be measured.

(b) A counter for counting the DS clock signal CL1 may be provided instead of the pointer comparator 34. In this case, the timer 23 performs a counting operation until the counter counts up to the predetermined number of clocks.

(c) The reference clock signal CLX is not limited to 400 MHz, but may employ a clock signal lower than 400 MHz such as, for example, 200 MHz, 100 MHz or the like, or a clock signal higher than 400 MHz such as 500 MHz, 600 MHz or the like.

(d) In place of the pointer comparator 34 and the determination circuit 24, the data transfer speed may be determined by software. For example, using a storage device which previously stores data on the determination results Y for the count time X, data of the determination result Y corresponding to a particular count time X of the timer 23 may be read from the storage device in accordance with a program to determine the data transfer speed.

Therefore, the present examples and embodiments are to be considered as illustrative and not restrictive and the invention is not to be limited to the details given herein, but may be modified within the scope and equivalence of the appended claims.

What is claimed is:

1. A method of transferring an encoded data signal including a clock signal and a data signal, comprising the steps of:
    decoding the encoded data signal to generate a decoded data signal and a write clock signal;
    storing the decoded data signal in a memory in accordance with the write clock signal;
    determining a data transfer speed of the encoded data signal using the write clock signal;

selecting a read clock signal corresponding to the determined data transfer speed from a plurality of read clock signals, wherein the plurality of read clock signals correspond to a plurality of predetermined data transfer speeds, respectively;

reading the decoded data signal stored in the memory in accordance with the read clock signal; and encoding the read decoded data signal and the read clock signal to generate an encoded data signal.

2. The method according to claim 1, wherein the step of determining the data transfer speed includes measuring a time required to store a predetermined number of bits of the encoded data signal in the memory by counting pulses of a reference clock signal.

3. The method according to claim 1, wherein the step of determining the data transfer speed includes the steps of:

measuring a time required to store a predetermined number of bits of the encoded data signal in the memory; and determining the data transfer speed based on the measured time.

4. The method of according to claim 3, wherein the step of measuring a time includes counting pulses of a reference clock signal to measure the time.

5. The method according to claim 1, further comprising the step of generating the plurality of read clock signals using a reference clock signal.

6. The method according to claim 1, wherein the encoded signal includes a strobe signal and a data signal, which are encoded in accordance with a Data-Strobe Link coding scheme.

7. The method according to claim 1, wherein the plurality of data transfer speeds include 100 DMbs, 200 Mbs and 400 Mbs.

8. An apparatus for transferring an encoded data signal including a clock signal and a data signal, comprising:

a decoder circuit for decoding the encoded data signal to generate a decoded data signal and write clock signal;

a memory, connected to the decoder circuit, for storing the decoded data signal in accordance with the write clock signal;

a transfer speed determining circuit for determining a data transfer speed of the encoded data signal in accordance with the write clock signal, wherein the transfer speed determining circuit selects a read clock signal corresponding to the determined data transfer speed from a plurality of read clock signals, wherein the plurality of read clock signals correspond to a plurality of data transfer speeds, respectively, and the decoded data signal is read from the memory in accordance with the read clock signal; and an encoder circuit, connected to the memory and the transfer speed determining circuit, for encoding the decoded data signal and the read clock signal to generate the encoded data signal.

9. The apparatus according to claim 8, wherein the memory includes:

a memory cell circuit for storing the decoded data signal;

a write pointer, connected td the memory cell circuit, for generating a write address of the memory cell circuit in accordance with the write clock signal;

a read pointer, connected to the memory cell circuit, for generating a read address of the memory cell circuit in accordance with the read clock signal; and a pointer comparator, connected to the write pointer and the read pointer, for comparing the write address with the read address to generate a comparison result signal, and wherein the transfer speed determining circuit includes:

a timer, connected to the pointer comparator, responsive to the comparison result signal to measure a time required to store a predetermined number of bits of the decoded signal in the memory cell circuit in accordance with the write clock signal;

a determining circuit, connected to the timer, for determining the transfer speed based on the time measured by the timer to generate a determination signal; and a clock signal generator circuit, connected to the determining circuit, for selecting a read clock signal corresponding to the determined data transfer speed from the plurality of read clock signals in accordance with the determination signal.

10. The apparatus according to claim 9, wherein the clock signal generator circuit generates the plurality of read clock signals using a reference clock signal.

11. The apparatus according to claim 9, wherein the timer counts pulses of a reference clock signal in response to the comparison result signal while the predetermined number of bits of the decoded data signal are stored in the memory cell circuit in accordance with the write clock signal.

12. The method according to claim 8, further comprising a clock signal generator for generating the plurality of read clock signals using a reference clock signal.

13. The method according to claim 8, wherein the plurality of data transfer speeds include 100 Mbs, 200 Mbs and 400 Mbs.

* * * * *